F. W. RUSSELL.
METHOD OF MAKING PNEUMATIC TIRE SHOES.
APPLICATION FILED APR. 4, 1916.
1,393,644.
Patented Oct. 11, 1921.
2 SHEETS—SHEET 1.
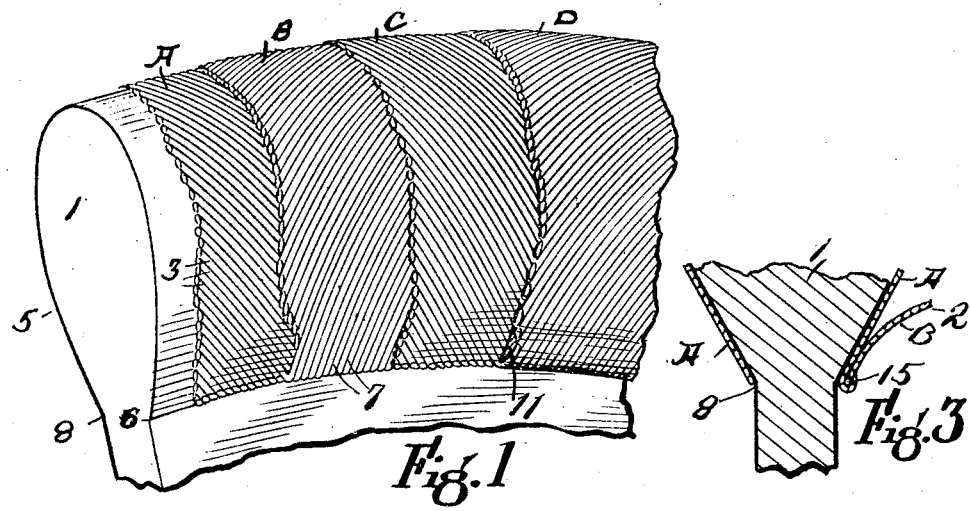
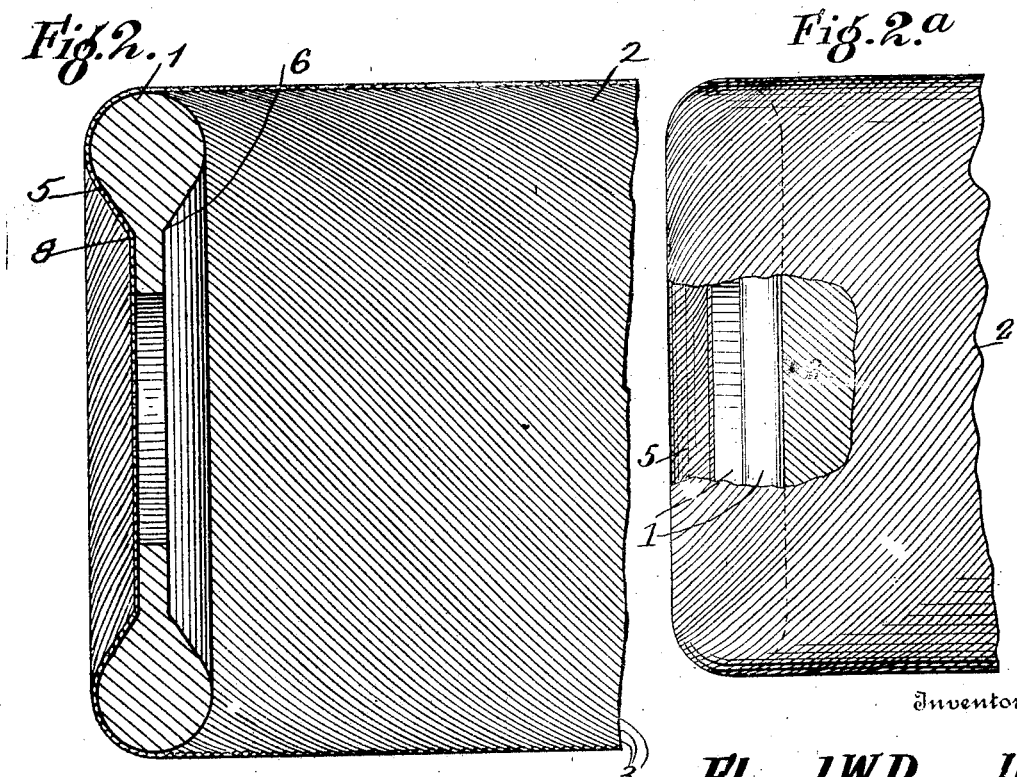
Inventor
Floyd W. Russell,
By C. E. Humphrey
Attorney

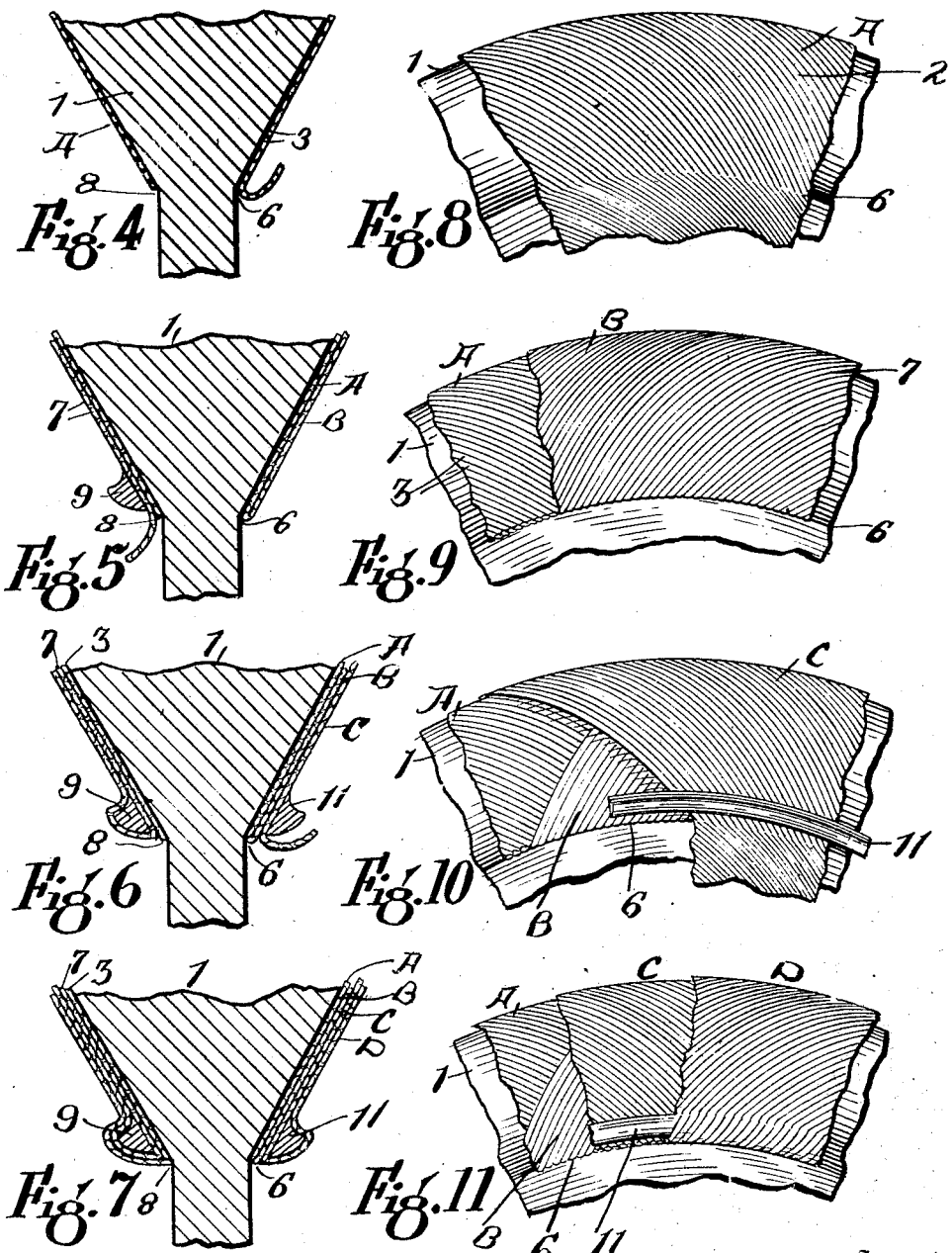

UNITED STATES PATENT OFFICE.

FLOYD W. RUSSELL, OF AKRON, OHIO.

METHOD OF MAKING PNEUMATIC-TIRE SHOES.

1,393,644.

Specification of Letters Patent.   Patented Oct. 11, 1921.

Application filed April 4, 1916. Serial No. 88,785.

*To all whom it may concern:*

Be it known that I, FLOYD W. RUSSELL, a citizen of the United States, residing at Akron, in the county of Summit and State of Ohio, have invented new and useful Improvements in Methods of Making Pneumatic-Tire Shoes, of which the following is a specification.

This invention relates to built-up pneumatic tires or tire-shoes which are primarily intended for use on automobiles where because of limited power it is particularly important to decrease all waste of power and any excessive friction within the tire shoe.

Tire shoes, for double-tube pneumatic tires for use on self-propelled vehicles, are built up according to this invention of what is known as cord fabric which is composed of strong, heavy, longitudinal warp cords held together by a skin coating of rubber or rubber cement which serves to hold contiguous members or cords together in parallelism and sufficiently firmly to permit the manipulation of the fabric without their being separated during the manipulation incidental to the placing of the same on a form during the construction of the tire-shoe, but at the same time they may be, if necessary, separated from each other temporarily, but when brought into contact they reunite due to the tacky or adhesive nature of the coating of rubber or rubber cement.

In this case, for convenience of phraseology, I shall designate the longitudinal cords as warp cords, as a clear distinction must be drawn between a fabric so constructed and the ordinary woven fabric which is cut on the bias so that when applied in the tire the warp and woof threads intersect each other at right angles and also at an angle to the plane of the tire.

Heretofore, cord tires have been constructed by the manipulation or placing of a single cord arranged at an angle to the plane of the tire and with the ends of each cord fastened at the bead portions and then extended backward and forward across the tread surface of the tire to build up the fabric and each individual cord fastened separately to an individual fastening device and then coating the tire shoe with rubber or rubber cement for the purpose of holding the cords in position, but as the building-up of a tire shoe in this manner involves a large amount of labor and takes an excessive length of time for the operation, I have conceived the idea of building up a tire shoe from a fabric composed of a plurality of cords wherein approximately the sole strength is in a line longitudinal of the cords, and the object of the invention is, therefore, to provide a new and improved method whereby tires or shoes may be made quickly and efficiently from a cord fabric without the necessity of special machinery and substantially without the necessity of skilled labor with the resulting product embodying all the advantages possessed or claimed to be possessed by a tire of this general type.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In carrying out my improved method of making tires I make use of certain mechanical instrumentalities, a preferred form of which is shown in the accompanying drawings wherein similar reference numerals indicate like parts in the different figures.

In the drawings,

Figure 1, is a perspective view of a forming core showing thereon a tire-shoe or carcass composed of cord fabric in the process of its formation;

Fig. 2, is a transverse sectional view of a core showing the first application of a sheet of cord fabric thereto as the first step of the process forming this invention the fabric being of tubular formation and shown in section;

Fig. 2ª is a side elevational view of a tubular fabric strip being attached to a core, the same being partially broken away to show the inclosed core;

Fig. 3, is a transverse sectional view of a core with the fabric placed thereon and embodying as an element a slight modification of the process which forms the subject matter of this invention;

Fig. 4, is a transverse sectional view of a core after the first layer of cord fabric has been applied thereto;

Fig. 5, is a view similar to Fig. 4 showing the application of the second layer of cord fabric;

Fig. 6, is a view similar to Figs. 4 and 5 showing the application of the third layer of fabric;

Fig. 7, is a view similar to Figs. 4 to 6 inclusive with the tire-shoe or carcass formed thereon;

Fig. 8, is a side elevation of the matter shown in Fig. 4;

Fig. 9, is a view similar to Fig. 8 of the matter shown in Fig. 5; and,

Figs. 10 and 11 are side elevational views of the construction shown in Figs. 6 and 7 respectively.

Referring to the drawings in detail the reference numeral 1 denotes the ordinary core or mandrel having the exterior shape which it is desired to impart to the interior of the shoe or tire to be formed thereon. A core for the building-up of tire shoes is usually supported upon suitable mechanism to permit of its revolution in a vertical plane, but the mechanism for supporting the core forms no part of this invention and therefore is not shown.

In practice, the core is usually first coated with a tacky or adhesive solution of rubber to cause the layers of the tubular fabric which are to be superposed thereon to stick in place and hold their shape and arrangement during the construction of the shoe or tire. The fabric employed consists of a sheet formed of longitudinally-extending, parallel, coadjacent and adhering warp cords 3 usually made heavier, thicker and stronger than the threads ordinarily employed in what is known as thread fabric. These cords are united into a sheet and held in sheeted relation with the cords extending in parallelism and held together by means of a substantially transparent solution of rubber so that when adjacent cords are brought into contact they adhere and may be separated at any time and brought into contact again and will be retained in substantially any position so long as the rubber solution does not dry out.

The sheet 2 of tubular formation is preferably of sufficient diameter and length to form the entire tire shoe and in practice one end thereof is so fashioned as to be capable of application to one lateral face 5 of the core 1 as clearly shown by section in Fig. 2 with the warp threads thereof where they are applied to the core arranged at an angle of 45° to the plane of the tire. As is illustrated, the end of the tubular strip is worked inwardly on the core 1, and smoothed as desired. The sheet 2 is applied to the entire outer curved surface of the core and carried down to a line indicated by the reference numeral 6 as shown in Figs. 4 and 8 and this application of the fabric constitutes the first layer A of the tire carcass. The second layer is formed by substantially turning the tubular sheet inside out, or folding the remaining portion of the tubular strip back on itself over the cords of the first layer A with the cords 7 of the second layer extending at approximately right angles to the cords of the first layer A. This forms the second layer B of the tire carcass. This second layer B is, of course, carried over the entire surface of the first layer A down to the line indicated by the reference numeral 8 and when properly smoothed in place a bead-forming core 9 is applied to the lateral face of the second layer B near the inner termination of this layer, as shown in Fig. 5. The bead core 9 is held in place by the adhesive nature of the rubber solution employed and the balance of the strip 2 is again turned inside out, or reversed, and then folded over the core 9 as shown in Fig. 6 and the balance of the strip is laid over the second layer B down to the line 6, thus forming the third layer C with the cords thereof at approximately right angles with respect to the cords of the second layer B and at an angle approximately 45° with respect to the plane of the tire. Afterward, a bead core 11 (see Figs. 6 and 10) is applied to the lateral face of the layer C adjacent to the line 6 and caused to adhere thereto by the sticky nature of the rubber solution employed. The balance of the tubular strip of fabric is again reversed and then carried over the bead core 11 and around the layer C and positioned with the cords thereof arranged at approximately right angles to the cords of the layer C and at angles approximating 45° with respect to the plane of the tire, thus forming the last and outer layer D. The layer D is carried down and around the layer C on the bead core A to the inner edge of the carcass and any surplus is usually trimmed off. The warp threads of each layer are positioned at angles approximating 45° to the plane of the tire, and when folded back on the next preceding layer they are laid at right angles thereto and all of the cords of all of the layers are arranged at angles approximating 45° to the plane of the tire so that when the tire shoe is built up it consists of four layers of cords, the cords of each layer arranged at approximately right angles to the cords of coadjacent layers and all of the cords at an angle approximating 45° with respect to the plane of the tire. Furthermore, it will be noted that by bringing the layers of cord fabric down to the lines indicated by the reference numerals 6 and 8 on the core and then applying the bead cores 9 and 11, the strips of cord fabric are carried around these beads and from thence extend outwardly and over the tread portion of the finished carcass, thereby securely anchoring the bead core in position and forming perfect beads. Afterward an ordinary covering or tread of rubber is applied to the structure in the ordinary manner and the entire carcass is vulcanized as usual.

In Fig. 3 is shown a slight modification of the process illustrated in the remaining figures. In this figure is shown the ordinary core 1 over which the layer of fabric 2 is applied as shown in Figs. 4 and 8 but before folding back the fabric to form the second layer B¹ apply a ring 15 formed of wire of cable or any other strength-giving instrumentality to the lateral face of the layer A and fold the remainder of the strip over this ring-shaped member 16 so that when the shoe is completed the bead on one side will have a bead core and also a ring or hook around which the fold is made between the layers A and B.

I claim:—

1. That improvement in methods of making cord tire structure for incorporation in a tire shoe which consists in forming an inner layer by applying one end of a sheet of said fabric to the outer face of a forming-core, said fabric consisting of a plurality of strength-giving cords arranged in parallelism and of sufficient diameter and length to make the complete structure of a tire carcass, with the warp threads of the inner layer extending diagonally with respect to the plane of the core, folding the entire sheet of fabric back on itself and over the first layer to form the second layer with the fold line near one inner edge of the structure and with the cords of the second layer arranged at approximately right angles to the cords of the first layer, applying a bead core to the outer face of said second layer, folding the fabric around said bead core and over said second layer with the cords thereof disposed at right angles to the cords of the second layer to form a third layer, applying a bead core to the outer face of said third layer and on the opposite side of said structure from the first bead core and finally folding said fabric around both bead cores and over the third layer the cords thereof being disposed at right angles to the cords of the third layer.

2. That improvement in methods of making a structure for incorporation in a tire-shoe which consists in folding a single unitary tubular sheet of textile fabric, consisting of a plurality of strength-giving cords extending in parallelism, said sheet being of sufficient diameter entirely to encompass the structure and form a complete layer of the structure to be built during each folding operation, folding said sheet laterally from side to side across a forming core to thereby provide repeated layers of said fabric with the fold lines of said sheet disposed near the inner edges of said forming core and with the strength-giving cords of alternate layers arranged at right angles with respect to each other and oblique to the longitudinal line of the structure.

3. That improvement in methods of making a structure for incorporation in a tire-shoe which consists in folding a single unitary sheet of tubular textile fabric composed of parallel strength-giving cords, said sheet being of width sufficient to form at one folding operation a complete envelop or layer for the structure, folding said sheet reversely back and forth over a core to form repeated layers of strength-giving material with the fold lines of each sheet disposed near the inner edges of said forming core, with the strength-giving cords of alternate layers disposed at approximately right angles to each other and all of said cords at an angle with respect to the longitudinal line of the structure.

In testimony whereof I have hereunto set my hand.

FLOYD W. RUSSELL.